United States Patent
Seligmann

(10) Patent No.: US 7,317,805 B2
(45) Date of Patent: Jan. 8, 2008

(54) TELEPHONE WITH INTEGRATED HEARING AID

(75) Inventor: Doree Duncan Seligmann, New York, NY (US)

(73) Assignee: Avaya Technology Corp., Basking Ridge, NJ (US)

(*) Notice: Subject to any disclaimer, the term of this patent is extended or adjusted under 35 U.S.C. 154(b) by 216 days.

(21) Appl. No.: 11/097,562

(22) Filed: Apr. 1, 2005

(65) Prior Publication Data

US 2005/0175202 A1 Aug. 11, 2005

Related U.S. Application Data

(62) Division of application No. 10/186,818, filed on Jul. 1, 2002.

(51) Int. Cl.
*H04R 25/00* (2006.01)

(52) U.S. Cl. ...................... 381/315; 381/312

(58) Field of Classification Search ........ 381/312–315, 381/320–321, 331; 379/52, 443
See application file for complete search history.

(56) References Cited

U.S. PATENT DOCUMENTS

| 5,768,397 | A | 6/1998 | Fazio |
| 6,230,029 | B1 | 5/2001 | Hahn et al. |
| 6,381,308 | B1 | 4/2002 | Cargo et al. |
| 6,754,358 | B1 * | 6/2004 | Boesen et al. ............... 381/312 |
| 6,952,483 | B2 | 10/2005 | Boesen et al. |
| 2001/0024507 | A1 | 9/2001 | Boesen |

* cited by examiner

*Primary Examiner*—Suhan Ni
(74) *Attorney, Agent, or Firm*—DeMont & Breyer LLC

(57) ABSTRACT

An integrated telephone and hearing aid that has a single in-ear speaker is disclosed. The illustrative embodiments automatically adapt the operation of the hearing aid based on whether a telephone call is in progress or not. For example, when the user is not engaged in a telephone call, the illustrative embodiments function as a normal hearing aid. But when the user does become engaged in a telephone call, the illustrative embodiments alter the hearing aid function so that the user can hear the telephone call. For example, the illustrative embodiments attenuate the hearing aid function while a call is in progress so that the user can hear both the telephone call and retain some, albeit diminished, auditory input from the environment. This enables, for example, the user to still hear loud sounds (e.g., a car horn, a fire alarm, a person screaming, etc.).

6 Claims, 4 Drawing Sheets

TELEPHONE WITH INTEGRATED HEARING AID

STATEMENT OF RELATED CASES

This case is a division of co-pending U.S. patent application Ser. No. 10/186,818, filed on Jul. 1, 2002.

FIELD OF THE INVENTION

The present invention relates to telecommunications equipment in general, and, in particular, to a telephone with an integrated hearing aid.

BACKGROUND OF THE INVENTION

Telephones have become ubiquitous, and hands-free headsets that rest in a user's ear are gaining in popularity. Furthermore, with the advent of electronic miniaturization and wireless standards such as "Bluetooth," entire telephones that rest in and/or on a user's ear are becoming available and will surely be popular.

Since such hands-free headsets typically employ an in-ear speaker—one that fits in the external auditory meatus and/or outer ear—some individuals with hearing loss might be prohibited from having both a hearing aid and a hands-free headset in an ear at the same time. Therefore, the need exists for a single apparatus that physically enables a user to have both a hearing aid and a hands-free headset in an ear at the same time.

SUMMARY OF THE INVENTION

The present invention enables the integration of a telephone and a hearing aid into a single apparatus having a single in-ear speaker, and, therefore, ameliorates the problem of wearing a hearing aid and an in-ear telephone simultaneously.

The illustrative embodiments automatically adapt the operation of the hearing aid based on whether or not the user is engaged in a telephone call. For example, when the user is not engaged in a telephone call, the illustrative embodiments function as a normal hearing aid. But when the user does become engaged in a telephone call, the illustrative embodiments alter the hearing aid function to enhance the use's ability to hear the telephone call.

Furthermore, the inventors of the present invention recognize that completely turning off the hearing aid while a call is in progress might be dangerous or disadvantageous because it diminishes the user's awareness of his or her environment. Therefore, the illustrative embodiments attenuate the hearing aid function while a call is in progress so that the user can hear both the telephone call and retain some, albeit diminished, auditory input from the environment. This enables, for example, the user to still hear loud sounds (e.g., a car horn, a fire alarm, a person screaming, etc.).

In some embodiments of the present invention, the hearing aid function is attenuated by reducing the gain of the hearing aid uniformly across all frequencies of the amplified acoustic signal. In contrast, some embodiments of the present invention attenuate some frequencies more than others. For example, the incoming sound of a telephone call is bandwidth limited to a range of between $f_1$ and $f_2$ Hz. In a typical telephony system $f_1=300$ Hz and $f_2=3000$ Hz. Therefore, some embodiments of the present invention reduce the gain of the hearing aid more for frequencies between $f_1$ and $f_2$ Hz than for frequencies below $f_1$ or above $f_2$. This also helps the user to hear both the ongoing telephone call and to be aware of his or her environment.

The first illustrative embodiment comprises: a microphone for converting a first acoustic signal into a first electromagnetic signal $s_1(t)$; a receiver for receiving a second electromagnetic signal $s_2(t)$; a processor for generating a third electromagnetic signal $s_3(t)$ based on $a_1(t) \cdot s_1(t)$ and $a_2(t) \cdot s_2(t)$, wherein $|a_1(t_1)/a_2(t_1)|$ changes based whether the apparatus is engaged in a telephone call or not; and a speaker for converting the third electromagnetic signal $s_3(t)$ into a second acoustic signal.

DETAILED DESCRIPTION

Figure 1:
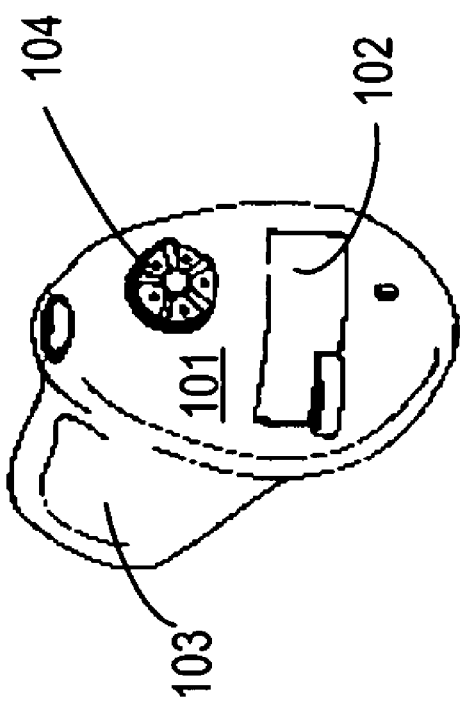
FIG. 1 depicts a rendering of telephone/hearing aid 100 in accordance with the first illustrative embodiment of the present invention.

FIG. 1 depicts a rendering of telephone/hearing aid 100 in accordance with the first illustrative embodiment of the present invention. As depicted in FIG. 1, telephone/hearing aid 100 comprises: housing 101, microphone 102, speaker 103, and volume control 104. In accordance with the first illustrative embodiment, telephone/hearing aid 100 is a wireless telephone (e.g., a cordless telephone, a cellular telephone, etc.) that operates with the telephone system via radio rather than via a wire. It will be clear to those skilled in the art, however, how to make and use embodiments of the present invention in which telephone/hearing aid 100 is a wireline telephone.

Housing 101 is designed like a hearing aid so that it can be worn within the external auditory meatus and outer ear. It will be clear to those skilled in the art how to make and use housing 101. Microphone 102, speaker 103, and volume control 104 are all described in detail below.

Figure 2:
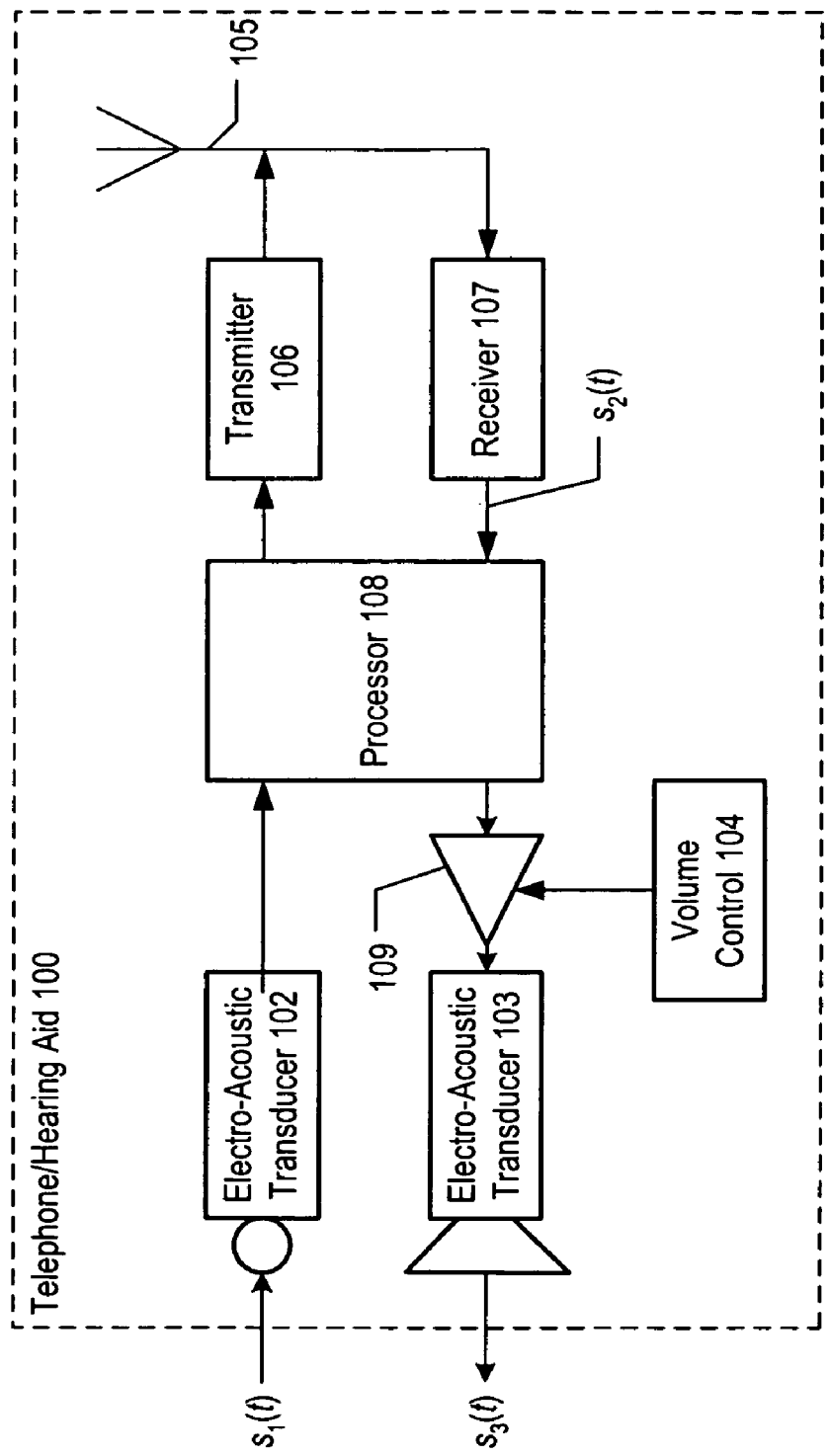
FIG. 2 depicts a block diagram of the salient components of telephone/hearing aid 100 in accordance with the first illustrative embodiment of the present invention.

FIG. 2 depicts a block diagram of the salient components of telephone/hearing aid 100 in accordance with the first illustrative embodiment of the present invention. As depicted in FIG. 2, telephone/hearing aid 100 comprises: microphone 102, speaker 103, volume control 104, antenna 105, wireless transmitter 106, receiver 107, processor 108, and amplifier 109, interconnected as shown.

Microphone 102 picks up an acoustic signal within the vicinity of housing 101, converts it to an electromagnetic signal, $s_1(t)$, and feeds signal $s_1(t)$ to processor 108, in well-known fashion. In accordance with the first illustrative embodiment, signal $s_1(t)$ is a wideband signal with a frequency band in excess of $[f_1, f_2]$.

Receiver 107 receives an incoming electromagnetic signal (e.g., a telephone call, etc.) via antenna 105 from a remote transmitter (not shown), demodulates the incoming signal, and passes the demodulated signal, $s_2(t)$, to processor 108, in well-known fashion. In accordance with the first illustrative embodiment, signal $s_2(t)$ represents a band-limited acoustic signal with a frequency range of $[f_1, f_2]$.

Speaker 103 receives a third electromagnetic signal, $s_3(t)$, from processor 108 via amplifier 109 and converts it into an acoustic signal, in well-known fashion. How processor 108 generates signal $s_3(t)$ is described in detail below.

Amplifier 109 receives signal $s_3(t)$ from processor 108 and amplifies it in well-known fashion. The gain of amplifier 109 is controlled by volume control 104, which enables a user of telephone/hearing aid 100 to affect the volume (i.e., the amount of acoustical energy) of the sound output of speaker 103. Furthermore, the gain of amplifier 109 is not affected by whether a telephone call is in progress or not.

Transmitter 106 receives an outgoing electromagnetic signal from processor 108, modulates the outgoing signal, and transmits the modulated signal via antenna 105, in well-known fashion.

Processor 108 receives:
(1) signal $s_1(t)$ from microphone 102, and
(2) signal $s_2(t)$ from receiver 107, and generates based on those signals:
(1) the output to transmitter 106, and
(2) signal $s_3(t)$.

When there is no call in progress (i.e., $s_2(t)=0$), telephone/hearing aid 100 functions solely as a hearing aid and, therefore, processor 108 generates signal $s_3(t)$ based solely on signal $s_1(t)$. For example, $$s_3(t)=a_1(t)\cdot s_1(t) \quad \text{(Eq. 1)}$$

wherein $a_1(t)$ is a coefficient that affects the gain or contribution of signal $s_1(t)$ to signal $s_3(t)$.

In contrast, when there is a call in progress (i.e., $s_2(t)\neq 0$), telephone/hearing aid 100 functions both as a hearing aid and as a telecommunications device. In this case, processor 108 combines, as described below, signal $s_2(t)$ and signal $s_1(t)$ to produce signal $s_3(t)$. For example, $$s_3(t)=a_1(t)\cdot s_1(t)+a_2(t)\cdot s_2(t) \quad \text{(Eq. 2)}$$

wherein $a_2(t)$ is a coefficient that affects the relative contribution of signal $s_2(t)$ to signal $s_3(t)$.

To ensure that the total sound energy entering the user's ear is a constant regardless of whether a telephone call is in progress or not, the total energy of signal $s_3(t)$ is maintained at a constant level both when a telephone call is in progress and when it is not. This is accomplished by having processor 108 automatically vary the coefficients $a_1(t)$ and $a_2(t)$, or the ratio of $a_1(t)/a_2(t)$, based on whether a telephone call is in progress or not. In other words, the absolute value of the ratio of $a_1(t)/a_2(t)$ is less when a call is in progress than when a call is not in progress (i.e., when signal $s_2(t)$ is less than a threshold).

Furthermore, processor 108 filters—in the frequency domain—signal $s_1(t)$ from microphone 102 so that the frequency components in signal $s_1(t)$ in the frequency range $[f_1, f_2]$ are more attenuated than the frequency components below $f_1$ or above $f_2$. In particular, processor 108 generates signal $s_3(t)$ based on:

$$s_3(t)=f(a_1(t)\cdot[h(t)*s_1(t)]+a_2(t)\cdot s_2(t)) \quad \text{(Eq. 3)}$$

wherein $h(t)$ is the impulse response of a frequency-domain notch filter with a notch band of $[f_1, f_2]$. It will be clear to those skilled in the art how to filter signal $s_1(t)$ in this way.

Furthermore, while a call is in progress, processor 108 feeds the input from microphone 102—which includes the user's voice—into transmitter 106 for transmission via antenna 105 and—for the purposes of sidetone—into signal $s_3(t)$.

Figure 3:
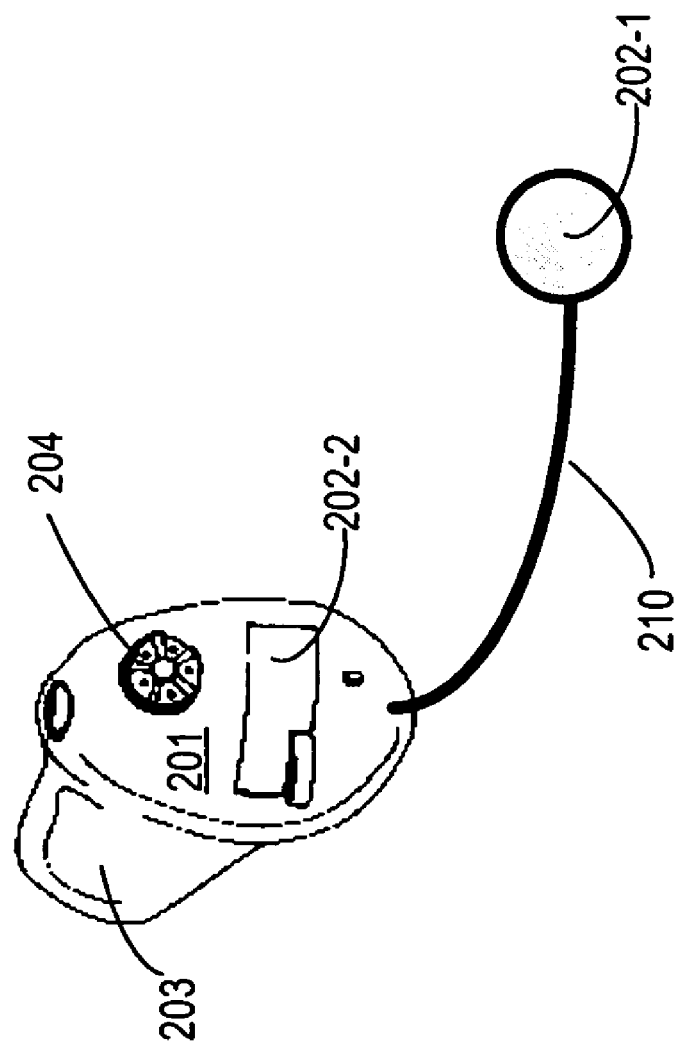
FIG. 3 depicts a rendering of telephone/hearing aid 200 in accordance with the second illustrative embodiment of the present invention.

FIG. 3 depicts a rendering of telephone/hearing aid 200 in accordance with the second illustrative embodiment of the present invention. As depicted in FIG. 2, telephone/hearing aid 200 comprises: housing 201, microphone 202-1, stalk 210, microphone 202-2, speaker 103, and volume control 104. In accordance with the second illustrative embodiment, telephone/hearing aid 200 is a wireless telephone (e.g., a cordless telephone, a cellular telephone, etc.) that operates with the telephone system via radio rather than via a wire. It will be clear to those skilled in the art, however, how to make and use embodiments of the present invention in which telephone/hearing aid 200 is a wireline telephone.

Housing 201 is designed like a hearing aid so that it can be worn within the external auditory meatus and outer ear. It will be clear to those skilled in the art how to make and use housing 101.

Stalk 210 is a structural member that positions microphone 202-1 closer to a user's mouth than microphone 202-2, which enables microphone 202-1 to pick up more of the user's voice during a telephone call than does microphone 202-2. Although both microphones will typically pick up many common sounds, microphone 202-1 is designed to pick up the user's own voice, whereas, in contrast, microphone 202-2 is designed to pick up all sounds in the vicinity of housing 201. The purpose for having two different microphones that are designed to pick up different sounds is described in detail below. Microphone 202-1, microphone 202-2, speaker 203, and volume control 204 are also all described in detail below.

Figure 4:
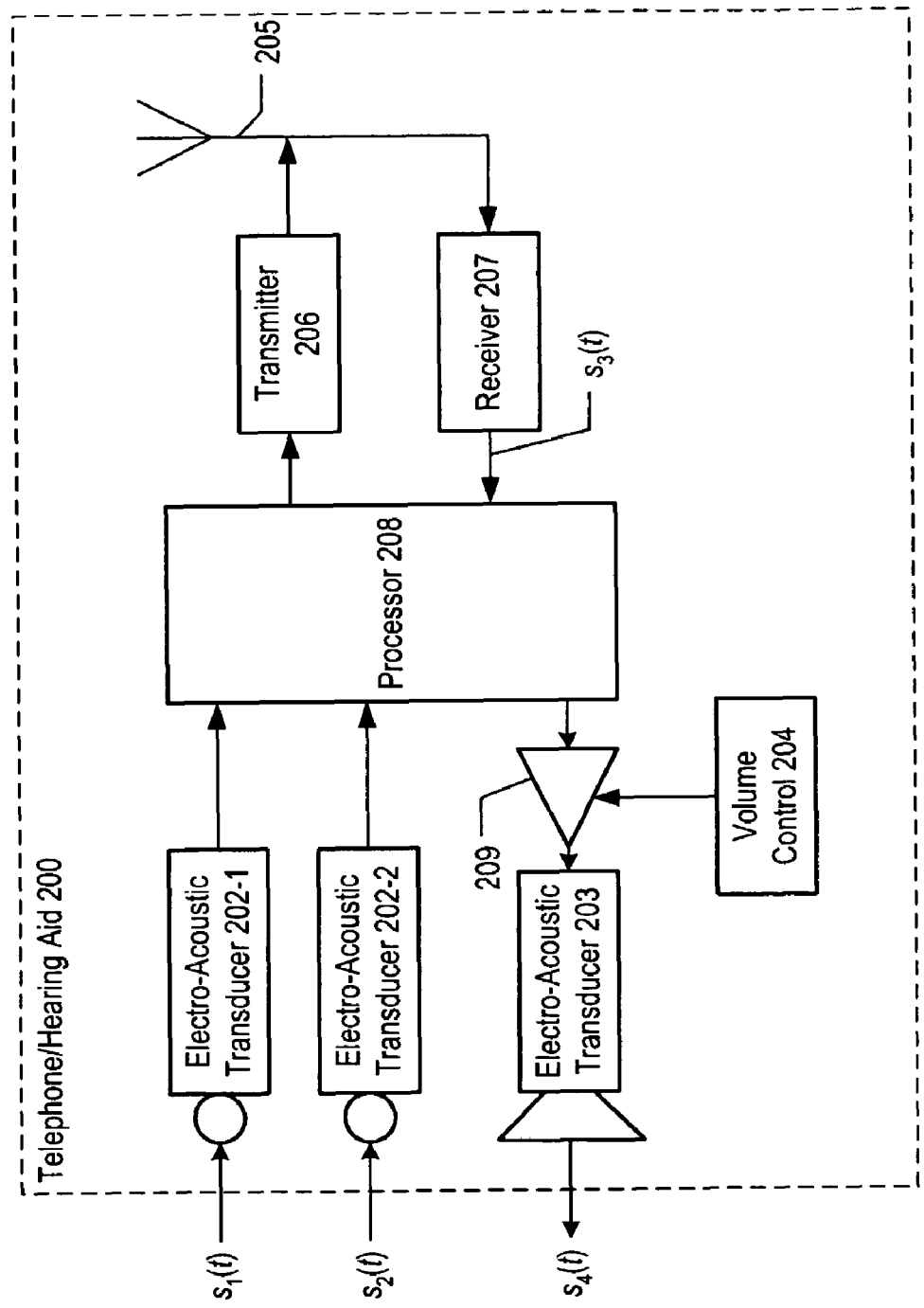
FIG. 4 depicts a block diagram of the salient components of telephone/hearing aid 200 in accordance with the second illustrative embodiment of the present invention.

FIG. 4 depicts a block diagram of the salient components of telephone/hearing aid 200. As depicted in FIG. 4, telephone/hearing aid 200 comprises: microphone 202-1, microphone 202-2, speaker 203, volume control 204, antenna 205, wireless transmitter 206, receiver 207, processor 208, and amplifier 209, interconnected as shown.

Microphone 202-1 picks up an acoustical signal at the end of stalk 210, converts it to an electromagnetic signal, $s_1(t)$, and feeds signal $s_1(t)$ to processor 208, in well-known fashion. In accordance with the second illustrative embodiment, signal $s_1(t)$ is a signal with a frequency band of $[f_1, f_2]$.

Microphone 202-2 picks up an acoustic signal within the vicinity of housing 201, converts it to an electromagnetic signal, $s_2(t)$, and feeds signal $s_2(t)$ to processor 208, in well-known fashion. In accordance with the illustrative embodiment, signal $s_2(t)$ is a wideband signal with a frequency band in excess of $[f_1, f_2]$.

Receiver 207 receives an incoming electromagnetic signal (e.g., a telephone call, etc.) via antenna 205 from a remote transmitter (not shown), demodulates the incoming signal, and passes the demodulated signal, $s_3(t)$, to processor 208, in well-known fashion. In accordance with the illustrative embodiment, signal $s_3(t)$ represents a band-limited acoustic signal with a frequency range of $[f_1, f_2]$.

Speaker 203 receives signal $s_4(t)$ from processor 208 via amplifier 209 and converts it into an acoustic signal, in well-known fashion. How processor 208 generates signal $s_4(t)$ is described in detail below.

Amplifier 209 receives signal $s_4(t)$ from processor 208 and amplifies it in well-known fashion. The gain of amplifier 209 is controlled by volume control 204, which enables a user of telephone/hearing aid 200 to affect the volume (i.e., the amount of acoustical energy) of the sound output of speaker 203. Furthermore, the gain of amplifier 209 is not affected by whether a telephone call is in progress or not.

Transmitter 206 receives an outgoing electromagnetic signal from processor 208, modulates the outgoing signal, and transmits the modulated signal via antenna 205, in well-known fashion.

Processor 208 receives:

(1) signal, $s_1(t)$, from microphone 202-1,
(2) signal, $s_2(t)$, from microphone 202-2, and
(3) signal, $s_3(t)$, from receiver 207, and generates based on those signals:

(1) the output to transmitter 206, and
(2) signal $s_4(t)$.

When there is no call in progress (i.e., $s_3(t)=0$), telephone/hearing aid 200 functions solely as a hearing aid and, therefore, processor 208 generates signal $s_4(t)$ based solely on signal $s_2(t)$. For example, $$s_4(t) = a_2(t) \cdot s_2(t) \quad \text{(Eq. 4)}$$

wherein $a_2(t)$ is a coefficient that affects the gain or contribution of signal $s_2(t)$ to signal $s_3(t)$.

In contrast, when there is a call in progress (i.e., $s_3(t) \neq 0$), telephone/hearing aid 200 functions both as a hearing aid and as a telecommunications device. In this case, processor 208 combines, as described below, signal $s_1(t)$, signal $s_2(t)$, and signal $s_3(t)$ to produce signal $s_4(t)$. For example, $$s_4(t) = a_1(t) \cdot s_1(t) + a_2(t) \cdot s_2(t) + a_3(t) \cdot s_3(t) \quad \text{(Eq. 5)}$$

wherein $a_1(t)$ is a coefficient that affects the gain or contribution of signal $s_1(t)$ to signal $s_4(t)$ and wherein $a_3(t)$ is a coefficient that affects the gain or contribution of signal $s_3(t)$ to signal $s_4(t)$.

To ensure that the total sound energy entering the user's ear is a constant regardless of whether a telephone call is in progress or not, the total energy of signal $s_4(t)$ is maintained at a constant level both when a telephone call is in progress and when it is not. This is accomplished by having processor 208 automatically vary coefficients $a_1(t)$, $a_2(t)$, and $a_3(t)$ or the ratio of $a_1(t)/a_2(t)$ and $a_2(t)/a_3(t)$ based on whether a telephone call is in progress or not.

Furthermore, processor 208 filters—in the frequency domain—signal, $s_2(t)$, from microphone 202-2 so that the frequency components in signal $s_2(t)$ in the frequency range $[f_1, f_2]$ are more attenuated than the frequency components below $f_1$ or above $f_2$. In particular, processor 208 generates signal $s_4(t)$ based on:

$$s_4(t) = a_1(t) \cdot s_1(t) + a_2(t) \cdot [h(t) * s_2(t)] + a_3(t) \cdot s_3(t) \quad \text{(Eq. 6)}$$

wherein $h(t)$ is the impulse response of a frequency-domain notch filter with a notch band of $[f_1, f_2]$. It will be clear to those skilled in the art how to filter signal $s_2(t)$ in this way. Furthermore, while a call is in progress, processor 208 feeds the input from microphone 202-1 (i.e., the user's voice) into transmitter 206 for transmission via antenna 205 and—for the purposes of sidetone—into signal $s_4(t)$.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
    a microphone for converting a first acoustic signal into a first electromagnetic signal $s_1(t)$;
    a receiver for receiving a second electromagnetic signal $s_2(t)$;
    a processor for generating a third electromagnetic signal $s_3(t)$ based on $a_1(t) \cdot s_1(t)$ and $a_2(t) \cdot s_2(t)$, wherein $|a_1(t)/a_2(t)|$ changes based on whether or not said apparatus is engaged in a telephone call; and
    a speaker for converting said third electromagnetic signal $s_3(t)$ into a second acoustic signal.

2. The apparatus of claim 1 wherein at least one of $a_1(t)$ and $a_2(t)$ changes based on $s_1(t)$.

3. The apparatus of claim 1 wherein $|a_1(t)/a_2(t_1)| < |a_1(t_2)/a_2(t_2)|$ when:
    (i) said apparatus is not engaged in at telephone call at time $t_1$,
    (ii) said apparatus is engaged in a telephone call at time $t_2$, and
    (iii) $a_1(t_1)$, $a_1(t_2)$, $a_2(t_1)$, and $a_2(t_2)$ are non-zero.

4. An apparatus comprising:
    a first microphone for converting a first acoustic signal into a first electromagnetic signal $s_1(t)$;
    a second microphone for converting a second acoustic signal into a second electromagnetic signal $s_2(t)$;
    a receiver for receiving a third electromagnetic signal $s_3(t)$;
    a processor for generating a fourth electromagnetic signal $s_4(t)$ based on $a_1(t) \cdot s_1(t)$, $a_2(t) \cdot s_2(t)$, and $a_3(t) \cdot s_3(t)$, wherein $|a_2(t)/a_3(t)|$ changes based whether or not said apparatus is engaged in a telephone call; and
    a speaker for converting $s_4(t)$ into a third acoustic signal.

5. The apparatus of claim 4 wherein at least one of $a_1(t)$, $a_2(t)$, and $a_3(t)$ changes based on at least one of $s_1(t)$ and $s_2(t)$.

6. The apparatus of claim 4 wherein $|a_2(t)/a_3(t_1)| < |a_2(t_2)/a_3(t_2)|$ when:
    (i) said apparatus is not engaged in at telephone call at time $t_1$,
    (ii) said apparatus is engaged in a telephone call at time $t_2$, and
    (iii) $a_1(t_1)$, $a_1(t_2)$, $a_3(t_1)$, and $a_3(t_2)$ are non-zero.

* * * * *